United States Patent
Kaneko et al.

(10) Patent No.: US 11,305,428 B2
(45) Date of Patent: Apr. 19, 2022

(54) ROBOT MOTION PLANNING DEVICE, ROBOTIC SYSTEM, AND METHOD

(71) Applicant: KABUSHIKI KAISHA TOSHIBA, Tokyo (JP)

(72) Inventors: Toshimitsu Kaneko, Kawasaki Kanagawa (JP); Tatsuya Tanaka, Kawasaki Kanagawa (JP); Ryosuke Nonaka, Yokohama Kanagawa (JP); Nao Mishima, Inagi Tokyo (JP); Tatsuo Kozakaya, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 264 days.

(21) Appl. No.: 16/567,033

(22) Filed: Sep. 11, 2019

(65) Prior Publication Data
US 2020/0164514 A1 May 28, 2020

(30) Foreign Application Priority Data
Nov. 28, 2018 (JP) .............................. JP2018-222085

(51) Int. Cl.
*B25J 9/16* (2006.01)
(52) U.S. Cl.
CPC .................... *B25J 9/1666* (2013.01)
(58) Field of Classification Search
CPC ...... B25J 9/1661; B25J 9/1664; B25J 9/1667; B25J 9/1666
See application file for complete search history.

(56) References Cited

U.S. PATENT DOCUMENTS

2009/0012632 A1    1/2009  Sekiai et al.
2018/0225113 A1*   8/2018  Hasegawa ................ B25J 9/161
2018/0250819 A1*   9/2018  Miyakoshi ............ B25J 9/1666

FOREIGN PATENT DOCUMENTS

JP    2007-272498 A    10/2007
JP    2018-126798 A     8/2018

* cited by examiner

*Primary Examiner* — Khoi H Tran
*Assistant Examiner* — Nhi Q Bui
(74) *Attorney, Agent, or Firm* — Finnegan, Henderson, Farabow, Garrett & Dunner L.L.P.

(57) ABSTRACT

According to one embodiment, a robot motion planning device includes processing circuitry. The processing circuitry receives observation information obtained by observing at least part of a movable range of a robot. The processing circuitry determines, in a case where first observation information is received, a target position to which the robot is to make a motion, using an action-value function and the first observation information. The processing circuitry receives measurement information obtained by measuring a state of the robot, calculates a difference corresponding to the first observation information, using the measurement information, and determines a motion plan of a force-controlled motion of the robot, based on the target position and the difference.

18 Claims, 8 Drawing Sheets

ROBOT MOTION PLANNING DEVICE, ROBOTIC SYSTEM, AND METHOD

CROSS-REFERENCE TO RELATED APPLICATIONS

This application is based upon and claims the benefit of priority from Japanese Patent Application No. 2018-222085, filed Nov. 28, 2018, the entire contents of which are incorporated herein by reference.

FIELD

Embodiments described herein relate generally to a robot motion planning device, a robotic system, and a method.

BACKGROUND

Various operations such as processing, assembly, coating, conveyance, and loading and unloading have been automated with robots. Position control executed by the robots is suitable for accurately repeating specific motions. However, under the position control of the robots, it is hard to execute flexible control that requires force regulation during motions, such as control executed to grasp a soft object without crushing the object. Thus, robots that can execute force control as well as the position control have been developed.

The force control is used, for example, when a robot packs items in a box or loads items. The robot can place one of the items while pressing it against the box or other items by using the force control, and thus can pack the items closely and efficiently.

However, the motion of the robots that execute the force control as well as the position control may be slower than that of robots that perform the same operations only by the position control. Therefore, it has been required to realize a new function that can shorten force-controlled motion times of robots.

DETAILED DESCRIPTION

Embodiments will be described hereinafter with reference to the accompanying drawings.

Various embodiments will be described hereinafter with reference to the accompanying drawings.

In general, according to one embodiment, a robot motion planning device includes a memory and processing circuitry. The processing circuitry is configured to receive observation information obtained by observing at least part of a movable range of a robot. The processing circuitry is configured to determine, in a case where first observation information is received, first target position to which the robot is to make a motion, using an action-value function and the first observation information. The action-value function is a function of observation information and a position, and is indicative of a value of a motion to be made by the robot. The processing circuitry is configured to receive measurement information obtained by measuring a state of the robot. The processing circuitry is configured to calculate a first difference corresponding to the first observation information, using the measurement information. The processing circuitry is configured to determine a motion plan of a force-controlled motion of the robot, based on the first target position and the first difference.

First Embodiment

Firstly, a configuration example of a robotic system including a robot motion planning device according to a first embodiment will be described with reference to FIG. 1. The robotic system is a system for controlling the motion of a robot main body 100 (hereinafter, also simply referred to as a robot), such as an articulated robot or a Cartesian coordinate robot. The robotic system includes the robot 100, one or more observation information generators 110A and 110B, and a robot motion planning device 120.

These components 100, 110A, 110B, and 120 are connected to each other via a wired or wireless network 130. Thus, the robot 100, the observation information generators 110A and 110B, and the robot motion planning device 120 may transmit and receive data (signals) via the network 130. The transmission and reception of data may be performed, not via the network 130, but by directly wired connection or wireless connection between components.

The robot 100 includes a robot sensor 101 for measuring the state of the robot 100. The robot sensor 101 may be contained in the robot 100, or may be attached to the robot 100. The robot sensor 101 includes at least one of various sensors, such as a force sensor, an angle sensor, an acceleration sensor, a distance sensor (i.e., a depth sensor), and a camera.

In the following description, a case where the robot 100 is an articulated robot including an end effector 102, actuators 103, and an articulated arm 104 will be exemplified. The end effector 102 is attached to the tip of the articulated arm 104 in order to move a target object (for example, an item). The end effector 102 is, for example, a gripper that is capable of grasping the target object.

The articulated arm 104 and the end effector 102 are controlled in accordance with the driving of the actuators 103. The actuators 103 are, for example, motors. Some of the actuators 103 are provided in joint portions where two arm portions constituting the articulated arm 104 are joined together. The articulated arm 104 moves, rotates, extends or contracts (that is, changes an angle between joints) and make other motions, in accordance with the driving of each of the actuators 103. In addition, one of the actuators 103 is also provided in a joint portion where an arm portion located at the tip of the articulated arm 104 and the end effector 102 are joined together. The end effector 102 grasps (grips) an object and frees (releases) the object in accordance with the driving of the actuator 103.

The observation information generators 110A and 110B generate observation information by observing at least part of a movable range of the robot 100. This range may include one or more objects that are targets to be operated by the robot 100. The observation information generators 110A and 110B are, for example, cameras that generate images or distance sensors that generate depth data. The observation information generators 110A and 110B may be installed in an environment (for example, a column or a ceiling in a room) including the robot 100, and may be attached to the robot 100. Each of the observation information generators 110A and 110, for example, observes at least part of the movable range of the robot 100 and generates observation information at all times while the robot 100 may make a motion.

The robot motion planning device 120 controls the motion of the robot 100. The robot motion planning device 120 may be realized as a computer, a dedicated control device for controlling the motion of the robot 100, etc.

A display 140 and an instruction input unit 150 may be connected to the robot motion planning device 120. The display 140 is a display device such as a liquid crystal display (an LCD), and may display the settings of the robot 100, the state of the robot 100, the conditions of operations performed by the robot 100, etc. The instruction input unit 150 is an input device including a keyboard and a pointing device such as a mouse. The display 140 and the instruction input unit 150 may be incorporated in the robot motion planning device 120.

In the present embodiment, a case where the operations performed by the robot 100 are the packing of items in a box will be described in order to make the explanation easier to understand. The operations performed by the robot 100, to which the configuration of the present embodiment may be applied, are not limited to the packing of items in a box, and may be any operations involving force control. The force control is control of the motion of the robot 100 based on, for example, force applied to at least part of the robot 100 (for example, the end effector 102). The force control enables operations to be performed without damaging both of the robot 100 and objects in the movable range of the robot 100 (for example, an item and a box for packing).

Figure 1:
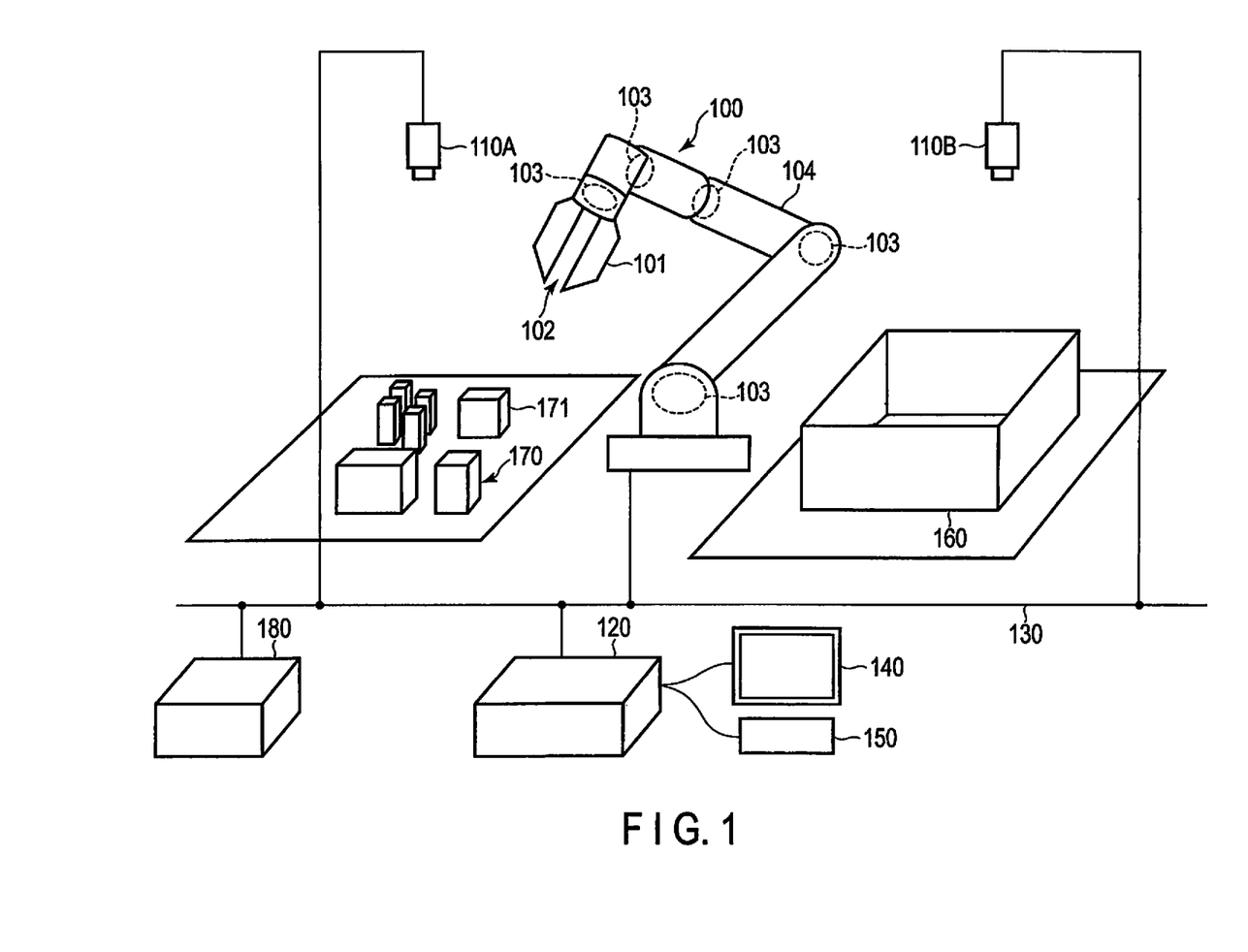
FIG. 1 is a diagram showing a configuration example of a robotic system including a robot motion planning device according to a first embodiment.

As shown in FIG. 1, the robot 100 makes a motion so as to pack one or more items 170 in a box 160. The box 160 is a container for shipment, etc., such as a corrugated box or a pallet for transportation.

The box 160 and the items 170 are each disposed on a workbench. Alternatively, the box 160 and the items 170 may be disposed on a belt conveyor that may convey each of them. In this case, the box 160 and the items 170 are disposed in the movable range of the robot 100 by the motion of the belt conveyor.

The observation information generator 110A is disposed, for example, above the items 170 so that the states of the items 170 are observable. The observation information generator 110A may be attached to part of the robot 100. The observation information generator 110A generates observation information by measuring the states of the items 170 from above. This observation information includes, for example, at least one of an image and depth data of the items 170.

The observation information generator 110B is disposed, for example, above the box 160 so that the state of the box 160 is observable. The observation information generator 110B may be attached to part of the robot 100. The observation information generator 110B generates observation information by measuring the state of the box 160 from above. This observation information includes, for example, at least one of an image and depth data of the box 160.

The robot motion planning device 120 creates a motion plan for at least grasping one of the items 170, moving it, and packing it in the box 160, using observation information generated by the observation information generators 110A and 110B. The robot motion planning device 120 causes the robot 100 to make a motion by sending a control signal based on the created motion plan to the actuators 103 of the robot 100.

The robotic system may include a simulator 180 that simulates the motion of the robot 100. The simulator 180 is realized as an information processing device such as a computer, and is used to learn an action-value function that indicate the value of a motion to be made by the robot 100.

In reinforcement learning by the simulator 180, a positive reward is given based on the number, volume, weight, etc., of items 170 that have been packed in the box 160, and a negative reward is given based on the fact that an item 170 collides with (that is, contacts) the box 160 or other items 170 when being packed in the box 160. For example, Q-Learning, Sarsa, or Actor-Critic are used as an algorithm of the reinforcement learning.

The action-value function obtained by learning is transported to the robot motion planning device 120. The simulator 180 delivers the action-value function to the robot motion planning device 120, for example, via the network 130.

The simulator 180 may be provided outside the robotic system. In this case, the robot motion planning device 120 may receive the action-value function obtained by learning via various storage media such as a USB flash memory.

Figure 2:
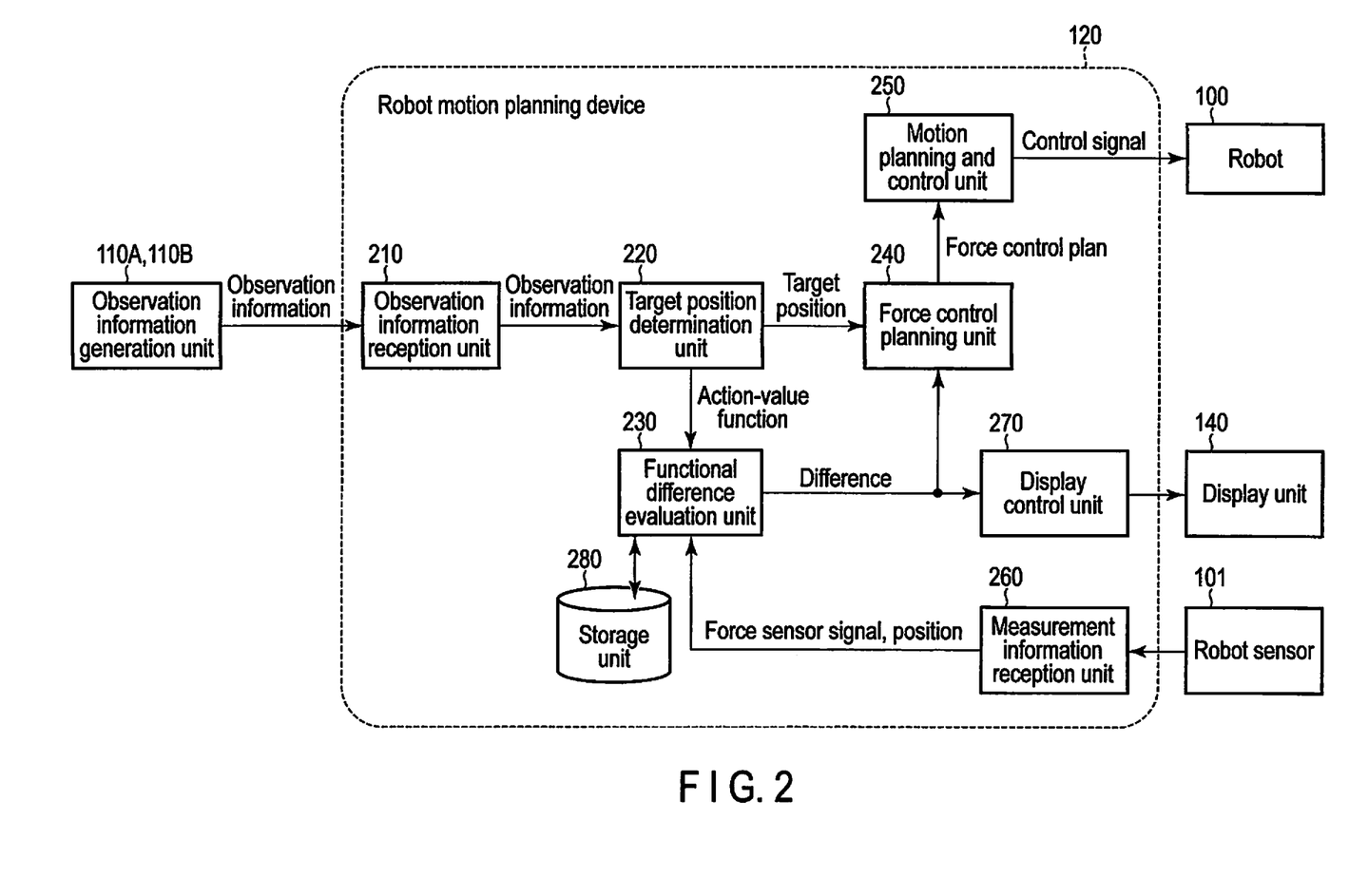
FIG. 2 is a block diagram showing a functional configuration example of the robot motion planning device of the first embodiment.

FIG. 2 shows a functional configuration example of the robot motion planning device 120. The robot motion planning device 120 includes an observation information reception unit 210, a target position determination unit 220, a functional difference evaluation unit 230, a force control planning unit 240, a motion planning and control unit 250, a measurement information reception unit 260, a display control unit 270, and a storage unit 280.

The observation information reception unit 210 acquires (receives) observation information S from the observation information generators 110A and 110B, for example, via the network 130. As described above, the observation information S includes, for example, at least one of an image and depth data of each of the items 170 and the box 160.

The measurement information reception unit 260 acquires (receives) measurement information F(A) from the robot sensor 101 in the robot 100, for example, via the network 130. The measurement information F(A) is obtained by measuring the state of the robot 100 by the robot sensor 101 while the robot 100 is making a motion based on a control signal transmitted from the robot motion planning device 120 (more specifically, the motion planning and control unit 250, which will be described later). The measurement information F(A) includes, for example, position data of a movable portion (herein, the end effector 102) of the robot 100 and a force sensor signal that indicates force applied to the movable portion. That is, the measurement information F(A) indicates the position of the movable portion of the robot 100 and the force applied to the movable portion at the position, and thus the position (position data) and the force (force sensor signal) are synchronized. The measurement information reception unit 260 outputs the measurement information F(A) to the functional difference evaluation unit 230.

The target position determination unit 220 determines a target position $A_0$ in the box 106 where one item (hereinafter, also referred to as a target item) 171 of the one or more items 170 is to be placed, using observation information S and an action-value function Q(S, A). The determined target position $A_0$ indicates a position or an area where the target item 171 is to be placed, and is represented by, for example, one or more coordinates. In addition, the target position $A_0$ may further indicate a posture, such as an orientation in which the target item 171 is to be placed or an inclination at which the target item 171 is to be placed.

The target position determination unit 220 may perform various processes such as a position detection process, a shape estimation process, and a posture estimation process on the observation information S. Data indicative of the positions, shapes, postures, etc., of the items 170 and the box 160 thereby can be obtained. The observation information S received by the observation information reception unit 210, that is, the observation information S provided by the observation information generators 110A and 110B, may include data indicative of the positions, shapes, postures, etc., of the items 170 and the box 160.

The action-value function Q(S, A) is a function of observation information S and a position A, and indicates the value of a motion to be made by the robot 100. That is, the action-value function Q(S, A) is a function for evaluating the value of the position A where an item is placed under the condition that the observation information S is input. The action-value function Q(S, A) is learned so that the value of a position where a lot of items 170 can be packed in the box 160 is high and the value of a position where an item collides with part of the other items 170 and the box 160 or collapses is low.

The target position $A_0$ is determined as a position where the action-value function Q(S, A) is the greatest, that is, determined by equation 1 below.

$$A_0 = \underset{A}{\mathrm{argmax}} Q(S, A) \qquad \text{equation 1}$$

The action-value function Q(S, A) may be realized as, for example, a lookup table or a neural network. The action-value function Q(S, A) is acquired by performing learning using a reinforcement learning algorithm such as Q-Learning or Sarsa by the simulator 180, which simulates the motion of the robot 100.

The target position determination unit 220 determines the target position $A_0$, using the received observation information S or data obtained by processing the observation information S, and the action-value function Q(S, A). More specifically, when first observation information $S_1$ is received, the target position determination unit 220 acquires a first action-value function $Q(S_1, A)$ corresponding to the first observation information $S_1$ from the action-value function Q(S, A), and determines the target position $A_0$, using the first action-value function $Q(S_1, A)$. The target position $A_0$ is a position where the first action-value function $Q(S_1, A)$ is the greatest.

The target position determination unit 220 outputs the determined target position $A_0$ to the force control planning unit 240. In addition, the target position determination unit 220 outputs the first action-value function $Q(S_1, A)$ to the functional difference evaluation unit 230.

The functional difference evaluation unit 230 calculates a difference D(S) corresponding to observation information S, using measurement information F(A) received by the measurement information reception unit 260. More specifically, the functional difference evaluation unit 230 calculates the difference D(S) corresponding to the observation information S, using a combination of an action-value function Q(S, A), which was input to the functional difference evaluation unit 230 in the past and corresponds to observation information S, and measurement information F(A) obtained by measuring a motion made by the robot 100 using the action-value function Q(S, A).

A difference D(S) corresponding to observation information S indicates the maximum distance over which the target item 171 can be moved by a force-controlled motion when the observation information S is received. Accordingly, as the difference D(S) becomes smaller, the maximum distance over which the target item 171 can be moved by the force-controlled motion becomes shorter. Thus, when the speed at which the target item 171 is moved by the force-controlled motion is constant, the possibility of a force-controlled motion time being shortened increases. In contrast, as the difference D(S) becomes greater, the maximum distance over which the target item 171 can be moved by the force-controlled motion becomes longer. Thus, when the speed at which the target item 171 is moved by the force-controlled motion is constant, the possibility of the force-controlled motion time being long increases.

The functional difference evaluation unit 230, for example, calculates (updates) a difference $D(S_1)$ corresponding to first observation information $S_1$, using a combination of a first action-value function $Q(S_1, A)$ corresponding to the first observation information $S_1$ and measurement information F(A) obtained by measuring a motion made by the robot 100 using the first action-value function $Q(S_1, A)$. The measurement information F(A) is measured while the robot 100 is actually making a force-controlled motion for a target position $A_0$ that determined using the first action-value function $Q(S_1, A)$.

If the number of combinations of an action-value function Q(S, A) and measurement information F(A) that were previously input is not sufficient (for example, is less than a threshold value), the functional difference evaluation unit 230 may set a specific value as a difference D(S) corresponding to observation information S. This specific value is, for example, a predetermined initial value.

Figure 3:
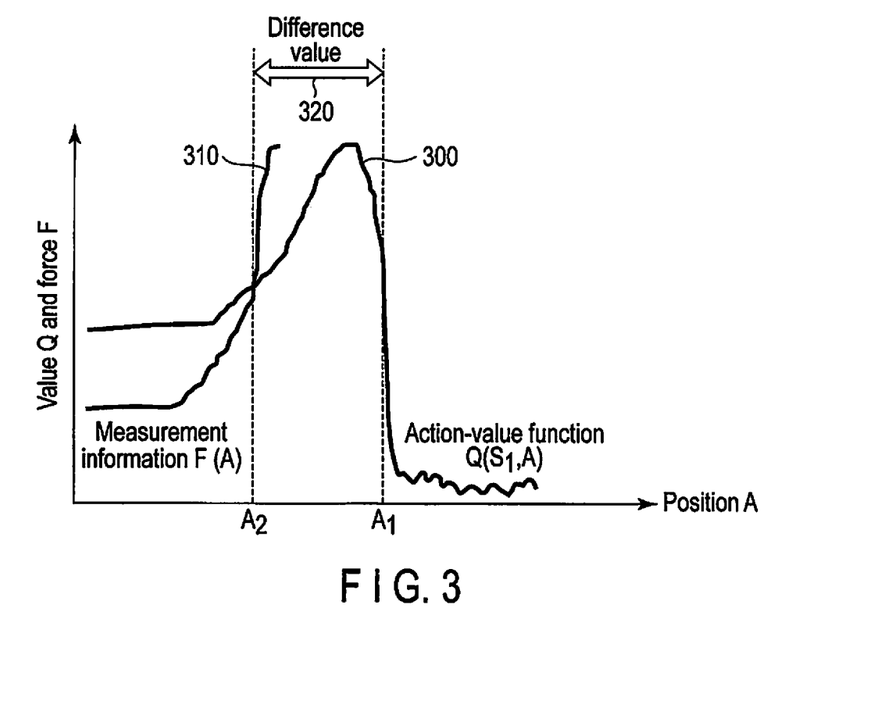
FIG. 3 is a diagram for explaining an example in which a difference between an action-value function and measurement information is calculated by the robot motion planning device of the first embodiment.

With reference to FIG. 3, an example in which the difference $D(S_1)$ corresponding to the first observation information $S_1$ is calculated using a combination of the action-value function $Q(S_1, A)$ corresponding to the first observation information $S_1$ and the measurement information F(A) will be described. In the example shown in FIG. 3, the horizontal axis represents a position A and the vertical axis represents a value Q and force F, and an action-value function $Q(S_1, A)$ 300 and measurement information F(A) 310 are shown. In FIG. 3, the position A is one-dimensionally illustrated in order to make the explanation easier to understand, but the position A may be two-dimensional or three-dimensional.

The functional difference evaluation unit 230 first detects a first change point of the action-value function $Q(S_1, A)$ 300 and a second change point of the measurement information $F(A)$ 310. The first change point of the action-value function $Q(S_1, A)$ 300 is a first position $A_1$ where the action-value function $Q(S_1, A)$ 300 suddenly declines (for example, declines by a first threshold value or more). The first position $A_1$ corresponds to a position where the target position determination unit 220 determines that the target item 171 contacts the box 160 or other items (for example, an item already placed in the box 160), on the basis of the action-value function $Q(S_1, A)$ 300.

The second change point of the measurement information $F(A)$ 310 is a second position $A_2$ where the measurement information $F(A)$ 310 exceeds a second threshold value. The second position $A_2$ corresponds to a position where the target item 171 actually contacts the box 160 or other items.

The functional difference evaluation unit 230 calculates a difference value 320 between the first position $A_1$ (the first change point) and the second position $A_2$ (the second change point), and stores the difference value 320, which is associated with the first observation information $S_1$, in the storage unit 280. The functional difference evaluation unit 230 reads one or more difference values associated with the first observation information $S_1$ from the storage unit 280, and calculates a statistic obtained by performing statistical processing on the one or more difference values, as the difference $D(S_1)$ corresponding to the first observation information $S_1$. In the storage unit 280, differences $D(S)$ respectively corresponding to pieces of observation information S that may be generated by the observation information generators 110A and 110B are stored. For example, an average value ($\mu$) or a value ($\mu + a\sigma$) obtained by adding variance ($\sigma$) multiplied by constant a to the average value is used as the statistic of the one or more difference values.

The functional difference evaluation unit 230 may calculate a difference value and update the difference $D(S_1)$ corresponding to the first observation information. $S_1$ by performing statistical processing using the difference value, whenever a combination of an action-value function $Q(S_1, A)$ corresponding to the first observation information $S_1$ and measurement information $F(A)$ is obtained.

If a large number of various pieces of observation information S are obtained, the pieces of observation information S may be divided into subsets, so that a statistic of difference values for each subset (that is, a difference $D(S)$ corresponding to each subset) may be calculated. Methods of forming subsets include a method of making a division according to the type of item and a method of using a clustering algorithm such as k-means clustering.

In addition, a difference $D(S)$ may be calculated by performing a regression analysis using the difference value 320 as a sample. In the regression analysis, a method of approximation with a predetermined function model, a method of learning with a neural network, etc., may be used.

FIG. 2 is referred to again. The force control planning unit 240 determines a motion plan of a force-controlled motion of the robot 100, based on a target position $A_0$ determined by the target position determination unit 220 and a difference $D(S)$ calculated by the functional difference evaluation unit 230. This motion plan includes, for example, one or more force control parameters.

An example of the force control parameters will be described with reference to FIG. 4. In the example shown in FIG. 4, it is assumed that the robot 100 packs the target item 171 in the box 160. In the box 160, an item 410 other than the target item 171 has already been packed. It is also assumed that the target position determination unit 220 has determined a target position 420 ($A_0$) where the target item 171 is to be placed and the functional difference evaluation unit 230 has calculated a corresponding difference $D(S)$.

The force control planning unit 240 determines a start point 430 and an end point 440 of a force-controlled motion made by the robot 100. The start point 430 is a position where the robot 100 starts the force-controlled motion. The end point 440 is a boundary position where the robot 100 is capable of making the force-controlled motion.

Figure 4:
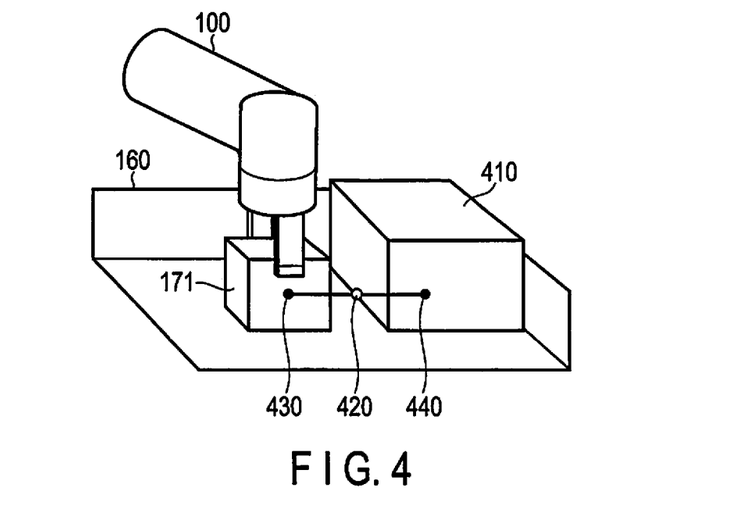
FIG. 4 is a diagram for explaining an example of one or more force control parameters used by the robot motion planning device of the first embodiment.

For example, the start point 430 is determined as a position that is located at a distance $cD(S)$ from the target position 420 in a direction opposite to a direction from the target position 420 to a surrounding obstacle (in the example shown in FIG. 4, the item 410). Here, c is a constant. The end point 440 is determined as a position that is located at the distance $cD(S)$ from the target position 420 in a direction opposite to a direction from the target position 420 to the start point 430.

The robot 100 (more specifically, the actuators 103) makes a motion so that after the target item 171 reaches the start point 430, the target item 171 is moved in a direction from the start point 430 to the target position 420 until force of a specific value is applied to the end effector 102, which grasps the target item 171. The robot 100 further makes a motion to end the movement of the target item 171 when the target item 171 reaches the end point 440, even if the force of the specific value is not applied to the end effector 102, which grasps the target item 171.

The force control planning unit 240 generates one or more force control parameters for causing the robot 100 to make the above motions. The force control parameters include, for example, the target position 420, the start point 430, and the end point 440. As a difference $D(S)$ for performing an operation safely is greater, a section (distance) over which force control is executed is made longer. Accordingly, the robot 100, which makes a motion based on the force control parameters, starts a force-controlled motion before a position where the target item 171 contacts the box 160 or other items 410, and thus can perform the operation safely without damaging any of the robot 100, the items 171 and 410, and the box 160. In addition, as the difference $D(S)$ for performing the safe operation is smaller, the section (distance) over which force control is executed is made shorter. Thus, the force-controlled motion time of the robot 100 can be shortened in a state in which the safety of the robot 100, etc., is secured.

FIG. 2 is referred to again. The motion planning and control unit 250 creates a motion plan other than the motion plan of the force-controlled motion of the robot 100 determined by the force control planning unit 240. That is, the motion planning and control unit 250 creates a motion plan for grasping the target item 171, moving the target item 171 to the start point 430 of force control, releasing the target item 171 after the force-controlled motion ends, moving each part (e.g., the end effector 102 and the articulated arm 104) of the robot 100 to a specific position (for example, an initial position), etc.

The motion planning and control unit 250 then sends, to the robot 100, a control signal based on a whole motion plan for packing the target item 171 by the robot 100. The motion plan includes the motion plan of the force-controlled motion determined by the force control planning unit 240. More specifically, the motion planning and control unit 250 generates a control signal sent to the actuators 103 in order to cause the robot 100 to make a motion according to the motion plan. That is, the motion plan is converted into a control signal for controlling the actuators 103. This control signal is, for example, a control signal instructing that the operation target item 171 be grasped by the end effector 102 and be moved to the start point 430, and when force applied to the end effector 102 exceeds a threshold value while the operation target item 171 is being moved from the start point 430 to the end point 440, or when the operation target item 171 reaches the end point 440 without the force applied to the end effector 102 exceeding the threshold value, the movement of the operation target item 171 be stopped and the operation target item 171 be released. The control signal may further instruct that after the target item 171 is released, a movable portion (for example, the end effector 102 and the articulated arm 104) of the robot 100 be returned to a specific initial position.

The motion planning and control unit 250 transmits the generated control signal to the robot 100 (more specifically, the actuators 103) via the network 130. The robot 100 thereby makes a motion according to the motion plan in accordance with the driving of the actuators 103 based on the control signal.

The display control unit 270 executes control so that various pieces of information on the motion plan of the robot 100 are displayed on a screen of the display 140. The displayed pieces of information are, for example, information on one or more differences D(S) calculated by the functional difference evaluation unit 230 and information on a force-controlled motion. The information on the differences D(S) is information on one or more differences D(S) corresponding to one or more pieces of observation information S, respectively, and may include, for example, an average, variance, a histogram, and a graph of chronological changes of the differences D(S). The information on the force-controlled motion may include, for example, a distance and a time for which the force-controlled motion is made.

In addition, the display control unit 270 may display a statistic of a difference D(S) of each type of item 170 as the information on the difference D(S) on the screen. A user thereby can recognize the maximum length (i.e., the maximum distance) over which force control may be performed for each type of item 170. In the case of an item 170 of a type for which the maximum length over which the force control may be executed is longer, it is likely to take much time for the robot 100 to pack the item 170. The user can modify the robot motion planning device 120 so that a motion for packing such an item 170 will be improved.

The display control unit 270 may select an item 170 of a type whose difference D(S) is large (for example, an item 170 whose difference D(S) exceeds a threshold value, or a specific number of items 170, selected in the order from largest difference D to smallest) from items of multiple types, and display information on the selected item 170 on the screen. The user thereby can recognize the item 170 of the type whose difference D(S) is large as an item for which the force-controlled motion time is likely to be long.

Moreover, the display control unit 270 may monitor fluctuations in a difference D(S) in chronological order, and thereby display whether or not the robot 100 is abnormal based on a result of the monitoring. The display control unit 270 displays a warning of failure, for example, when the difference D(S) or the amount of fluctuations in the difference D(S) per unit time exceeds a threshold value. The warning of failure may be given in any form that can notify the user of the failure, and may be given, for example, with a sound.

By virtue of the above-described configuration, it is possible to shorten the force-controlled motion time of the robot 100 while causing the robot 100 to make a motion safely. The robot motion planning device 120 evaluates a difference between an action-value function Q(S, A), which is obtained by evaluating the value of each piece of observation information S and each position A, and measurement information F(A) obtained by the robot sensor 101, and plans a safe force-controlled motion of the robot 100. It is therefore possible to shorten a time required for a motion of the robot 100 made for a target position $A_0$ based on the action-value function Q(S, A) learned by the simulator 180, while securing the safety of the motion.

Incidentally, methods of setting a parameter of a force-controlled motion (i.e., a force control parameter) by reinforcement learning include, for example, a method of employing reinforcement learning in which in a real robotic system, a positive reward is given when the force-controlled motion time is short, and a negative reward is given when an item is damaged. According to this method, a force control parameter with which the item is not damaged and the motion time is short can be learned. However, in the reinforcement learning in which the real robotic system is used, it takes time for a robot to make an actual motion, and further, the item or the robot may be damaged until sufficient learning is performed. Thus, the cost for the reinforcement learning in which the real robotic system is used is considerable.

Accordingly, a method of performing the reinforcement learning by a simulator in a computer and implementing a result of the learning in a robotic system after sufficient learning is performed is conceivable. According to this method, the robotic system uses a force control parameter learned by the simulator as an initial value, and is optimized by further performing the reinforcement learning based on an actual motion of a robot.

However, the motion of the robot simulated by the simulator and the motion of the actual robot may be different. In addition, a parameter learned by the simulator is a force control parameter optimized for the simulator. Thus, when the actual robot makes a motion using the force control parameter as it is, an item or the robot may be damaged because of a difference between the simulator and the actual robot.

According to the configuration of the above-described present embodiment, not only an action-value function Q(S, A), which is a force control parameter generated by learning with the simulator 180, but also a difference D(S) is used. Thus, it is possible to shorten the force-controlled motion time of the robot 100 while causing the actual robot 100 to make a motion safely.

Figure 5:
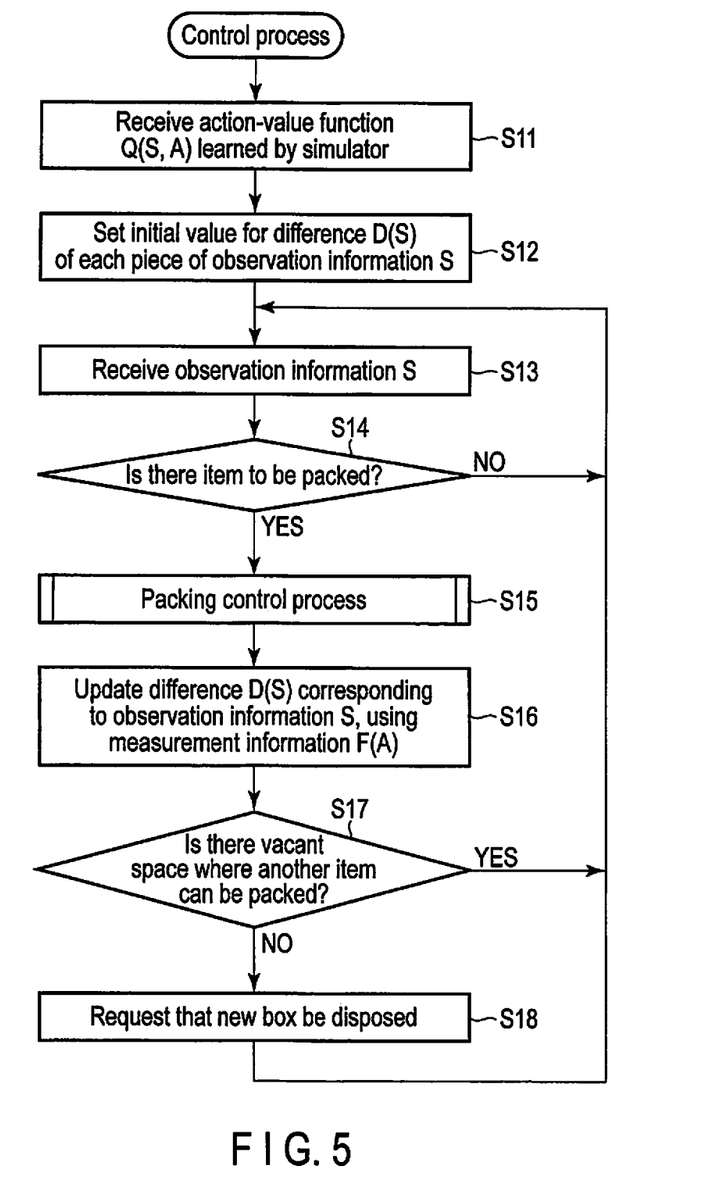
FIG. 5 is a flowchart showing an example of the procedure of a control process executed by the robot motion planning device of the first embodiment.

The flowchart of FIG. 5 shows an example of the procedure of a control process executed by the robot motion planning device 120.

First, the robot motion planning device 120 receives an action-value function Q(S, A) generated by reinforcement learning with the simulator 100, which can simulate the motion of the robot 100 (step S11). The robot motion planning device 120 receives the action-value function Q(S, A), for example, in response to the completion of the reinforcement learning with the simulator 180 or in response to an operation by an administrator of the robotic system.

When the reinforcement learning is performed by Q-Learning, Sarsa, etc., the action-value function Q(S, A) can be directly learned. When the reinforcement learning is performed by Actor-Critic, an advantage function for evaluation may be used instead of the action-value function Q(S, A). On the other hand, according to some of reinforcement learning methods based on a policy gradient, etc., the action-value function Q(S, A) is not used. When such a learning method is used, learning may be performed by determining a force control parameter by approximately using a target position $A_0$ determined by the target position determination unit 220, instead of a change point of the action-value function Q(S, A) 300 (that is, the first position $A_1$ where the action-value function Q(S, A) 300 suddenly declines) shown in FIG. 3.

After the action-value function Q(S, A) is received, the robot motion planning device 120 initializes a difference D(S) for each piece of observation information S (step S12). That is, the robot motion planning device 120 sets respective initial values for differences D(S) respectively corresponding to pieces of observation information S that may be observed by the observation information generators 110A and 110B.

In addition, the robot motion planning device 120 receives observation information S from the observation information generators 110A and 110B (step S13). The robot motion planning device 120 determines whether or not there is an item 170 to be packed, using the observation information S (step S14). When there is no item 170 to be packed (NO in step S14), the flow returns to step S13, and it is determined again whether or not there is an item 170 to be packed.

When there is an item 170 to be packed (YES in step S14), the robot motion planning device 120 executes a packing control process for packing one of the items 170 in the box 160 (step S15). In the packing control process, a process for causing the robot 100 to make a packing motion including a force-controlled motion is executed. A specific procedure in the packing control process will be described later with reference to the flowchart of FIG. 6.

Next, the robot motion planning device 120 updates the difference D(S) corresponding to the observation information S received in step S13, using measurement information F(A) received in the packing control process (step S16). The measurement information F(A) includes, for example, position data of the end effector 102 and a force sensor signal indicating force applied to the end effector 102, during the packing motion of the robot 100. The robot motion planning device 120 updates the difference D(S) corresponding to the observation information (S), using a difference value between the action-value function Q(S, A) corresponding to the observation information S and the received measurement information F(A). The difference value may be stored in the storage unit 280.

The robot motion planning device 120 determines whether or not there is a vacant space where another item 170 can be packed in the box 160 (step S17). When there is a vacant space (YES in step S17), the flow returns to step S13, and a process for packing the other item 170 in the box 160 is executed.

In contrast, when there is no vacant space (NO in step S17), the robot motion planning device 120 requests that a new box 160 be disposed (step S18), and the flow returns to step S13. In accordance with this request, the current box 160 is carried out and the new box 160 is carried in, for example, by the motion of the belt conveyor. The new box 160 is thereby disposed at a specific position where an item 170 can be packed by the robot 100.

In this manner, a procedure in step S13 to step S18 is repeatedly executed, and the robot 100 thereby can be made to repeat the packing motion for packing one item 170 in the box 160. Whenever measurement information F(A) is obtained by the packing motion, a corresponding difference D(S) is updated using the measurement information F(A) as feedback. Thus, the difference D(S) can be optimized in accordance with the actual configuration and environment of the robot 100.

The process may be executed again from step S11, in a case where a new action-value function Q(S, A) is provided by the simulator 180, a case where the configuration of the robotic system is changed, etc.

Figure 6:
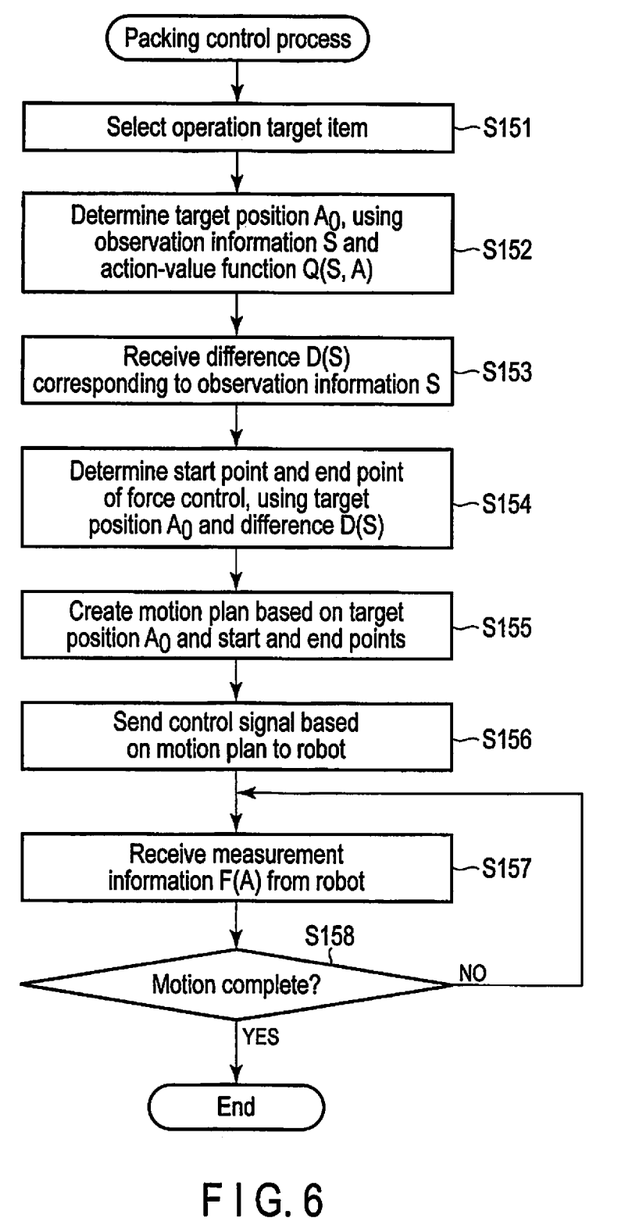
FIG. 6 is a flowchart showing an example of the procedure of a packing control process in the control process of FIG. 5.

An example of the procedure in the packing control process executed by the robot motion planning device 120 will be described with reference to the flowchart of FIG. 6. This packing control process corresponds to step S15 of the control process described above with reference to FIG. 5.

First, the robot motion planning device 120 selects one target item 171 from items 170 to be packed (step S151). The robot motion planning device 120 selects a one target item 171 to be packed in the box 160 from the items 170 to be packed, for example, on the basis of the size, volume, weight, etc., of each item.

The robot motion planning device 120 determines a target position $A_0$ where the target item 171 is packed, using the observation information S and the action-value function Q(S, A) (step S152). The robot motion planning device 120 determines a position where the action-value function Q(S, A) corresponding to the observation information S is the greatest as the target position $A_0$.

Then, the robot motion planning device 120 receives a difference D(S) corresponding to the observation information S from the storage unit 280 (step S153). A difference D(S) corresponding to observation information S is calculated by using measurement information F(A) measured in a packing motion made when the observation information S was previously obtained. More specifically, the difference D(S) corresponding to the observation information S is calculated using a difference value between an action-value function Q(S, A) corresponding to the observation information S and the measurement information F(A). This calculation method is as described above with reference to FIG. 3.

The robot motion planning device 120 determines a start point and an end point of force control, using the target position $A_0$ and the difference D(S) corresponding to the observation information S (step S154). A method of determining the start point and the end point of the force control is as described above with reference to FIG. 4.

The robot motion planning device 120 creates a motion plan of the robot 100, based on the target position $A_0$ and the start point and the end point of the force control (step S155). In addition, the robot motion planning device 120 sends, to the robot 100, a control signal for causing the robot 100 to make a motion according to the motion plan (step S156).

Then, the robot motion planning device 120 receives measurement information F(A) from the robot 100 (step S157). The robot motion planning device 120 determines whether or not the motion of the robot 100 based on the control signal sent in step S156 is complete (step S158). When the motion of the robot 100 is not complete (NO in step S158), the flow returns to step S157, and the reception of measurement information F(A) is continued.

In contrast, when the motion of the robot 100 is complete (YES in step S158), the process is ended.

Through the above-described process, the robot 100 can be controlled to make a motion for packing the one target item 171 in the box 160, and measurement information F(A), which is obtained by measuring the state of the robot 100 during the motion, can be received.

Figure 7:
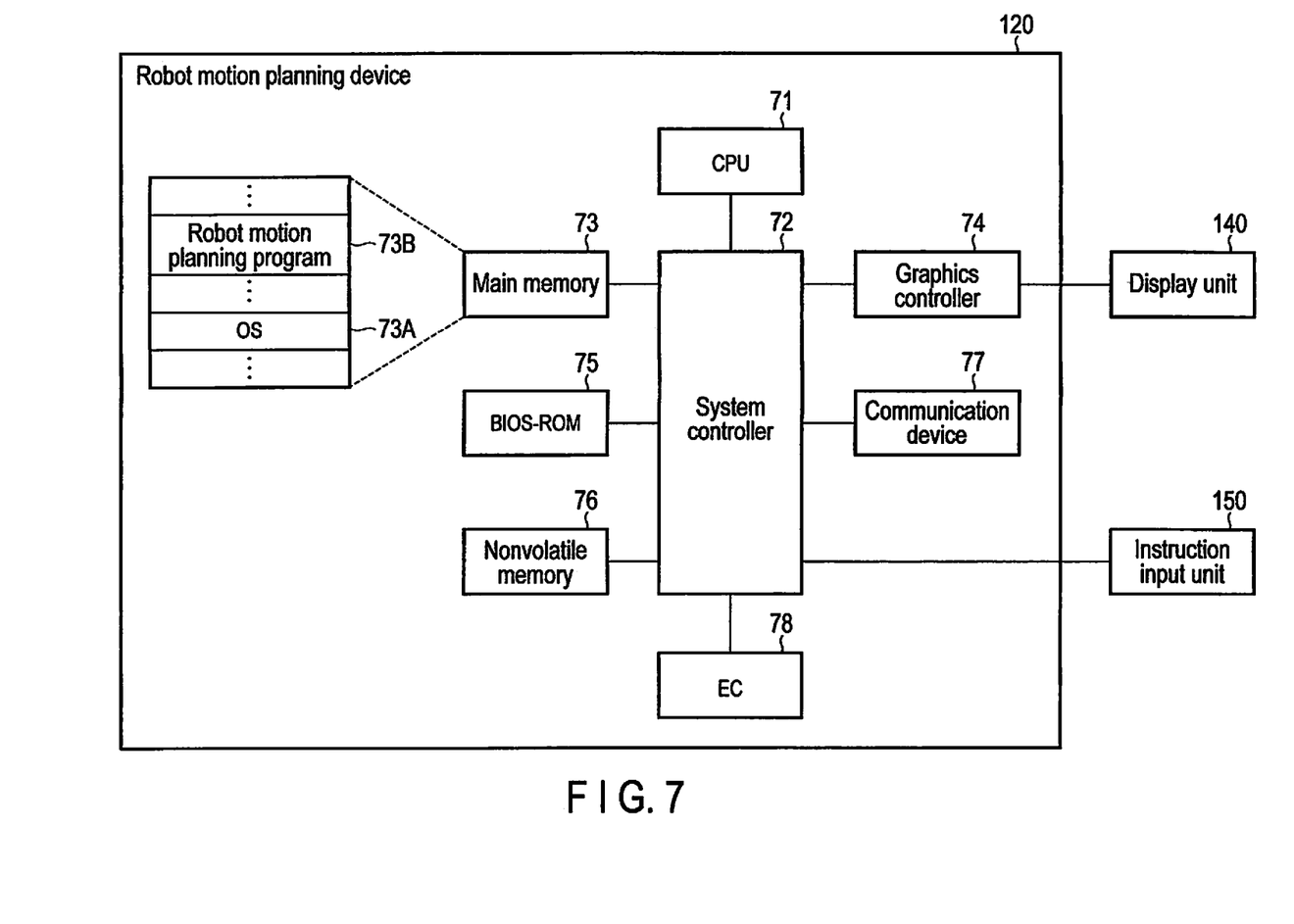
FIG. 7 is a block diagram showing a system configuration example of the robot motion planning device of the first embodiment.

FIG. 7 shows a system configuration example of the robot motion planning device 120. The robot motion planning device 120 includes a CPU 71, a system controller 72, a main memory 73, a graphics controller 74, a BIOS-ROM 75, a nonvolatile memory 76, a communication device 77, and an embedded controller (EC) 78.

The CPU 71 is a processor that controls the operation of various components in the robot motion planning device 120. The CPU 71 executes various programs loaded from the nonvolatile memory 76, which is a storage device, into the main memory 73. The programs include an operating system (OS) 73A and various application programs. The application programs include a robot motion planning program 73B. The robot motion planning program 73B includes instructions for realizing the respective functions of the observation information reception unit 210, the target position determination unit 220, the functional difference evaluation unit 230, the force control planning unit 240, the motion planning and control unit 250, and the measurement information reception unit 260, which are shown in FIG. 2. In addition, part of a memory area of the nonvolatile memory 76 may be used as the storage unit 280.

The CPU 71 also executes a basic input/output system (BIOS) stored in the BIOS-ROM 75. The BIOS is a program for hardware control.

The system controller 72 is a device that connects a local bus of the CPU 71 and various components. The system controller 72 also contains a memory controller that executes access control of the main memory 73. In addition, the system controller 72 also has the function of communicating with the graphics controller 74 via, for example, a serial bus conforming to the PCI EXPRESS standard.

The graphics controller 74 is a display controller that controls the display 140 connected to the robot motion planning device 120. A display signal generated by the graphics controller 74 is sent to the display 140. The display 140 displays a screen image based on the display signal.

The system controller 72 further contains a USB controller. The USB controller controls, for example, the transmission and reception of data to and from the instruction input unit 150 connected via a USB terminal provided in the robot motion planning device 120.

The communication device 77 is a device configured to perform wired or wireless communication. The communication device 77 includes a transmission unit that transmits a signal and a reception unit that receives a signal.

The EC 78 is a single-chip microcomputer including an embedded controller for power management. The EC 78 has the function of turning the robot motion planning device 120 on or off in response to the user's operation of a power button.

Second Embodiment

In the first embodiment, a difference D(S) corresponding to observation information S is updated in accordance with an actual motion of the robot 100. In contrast, in a second embodiment, not only a difference D(S) but also an action-value function Q(S, A) is updated in accordance with an actual motion of a robot 100.

The configuration of a robot motion planning device 120 according to the second embodiment is the same as the configuration of the robot motion planning device 120 according to the first embodiment. Only a procedure in a process added to update the action-value function Q(S, A) differs between the second embodiment and the first embodiment. In the following description, only points differing from those of the first embodiment will be described.

Figure 8:
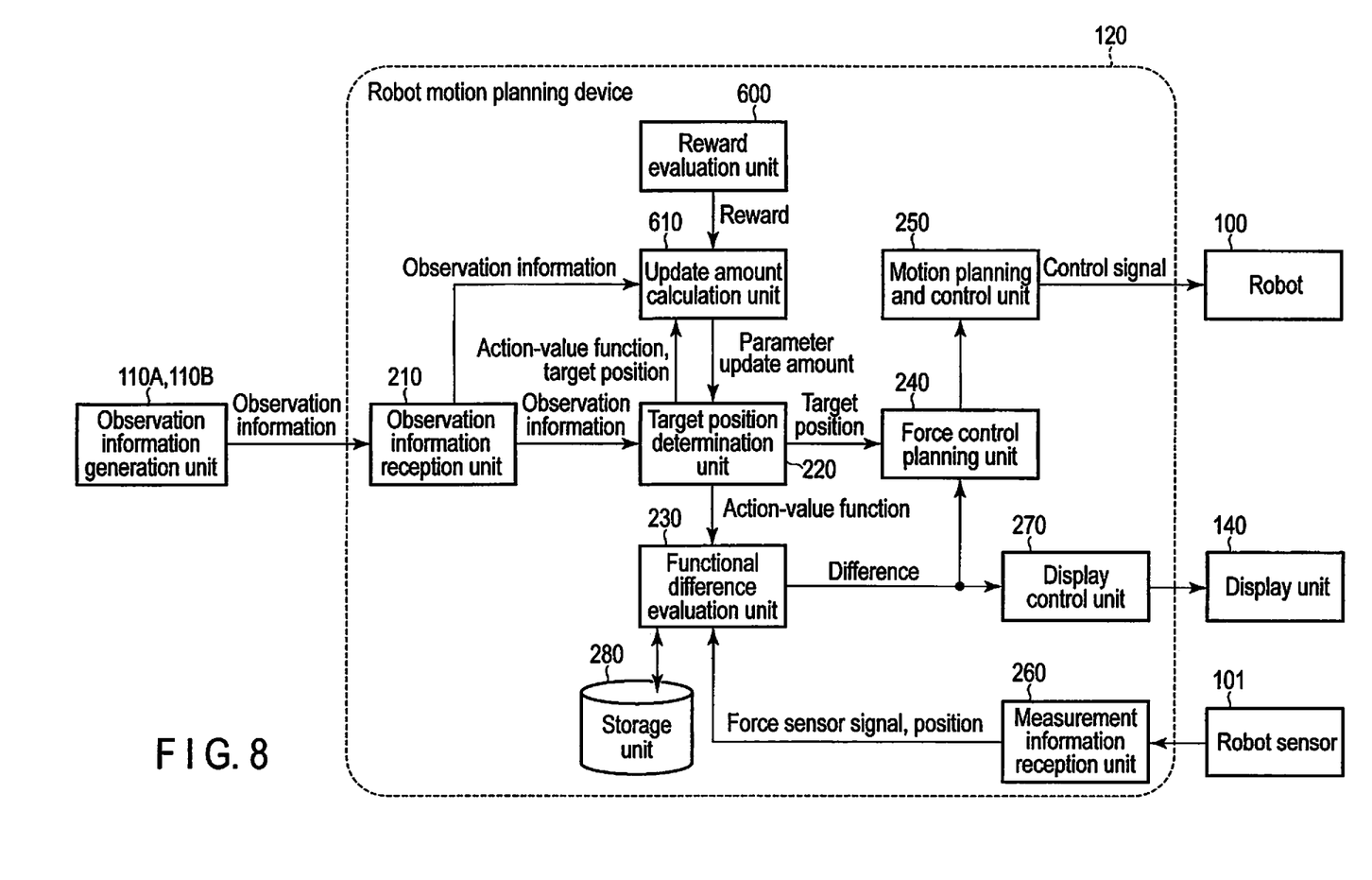
FIG. 8 is a block diagram showing a functional configuration example of a robot motion planning device according to a second embodiment.

FIG. 8 shows a functional configuration of the robot motion planning device 120 according to the second embodiment. In this configuration, a reward evaluation unit 600 and an update amount calculation unit 610 are added to the functional configuration of the robot motion planning device 120 according to the first embodiment shown in FIG. 2.

The reward evaluation unit 600 evaluates an actual motion of the robot 100 made according to a motion plan for packing an target item 171 in a box 160, and determines a reward R for the motion. For example, when part of the robot 100 or the target item 171 collides with the box 160 or other items during the motion for packing the target item 171 in the box 160, a high negative value is set as the reward R for the motion. In contrast, when the target item 171 is packed in the box 160 without part of the robot 100 or the target item 171 colliding with the box 160 or other items, zero or a positive value is set as the reward R for the motion.

In addition, when there is no vacant space for further packing an item 170 in the box 160, the reward R is set in accordance with an index based on the number, volume and weight of items 170 packed in the box 160, the proportion of the packed items 170 to the space of the box 160, etc. As the index is greater, a higher positive value is set as the reward R. A value according to a time required from when the target item 171 is grasped until the target item 171 is packed may be further added to the reward R.

An event such as a collision during the motion for packing the target item 171 in the box 160 or a lack of vacant space for further packing an item 170 in the box 160 may be automatically detected, using observation information S generated by the observation information generators 110A and 110B or measurement information F(A) generated by the robot sensor 101, or may be input by a user's operation via the instruction input unit 150.

The reward evaluation unit 600 sends the determined reward R to the update amount calculation unit 610.

The update amount calculation unit 610 and the target position determination unit 220 update an action-value function Q(S, A), using the reward R transmitted from the reward evaluation unit 600. More specifically, the update amount calculation unit 610 calculates an update amount Δ of the action-value function Q(S, A), based on the reward R and the action-value function Q(S, A) being used by the target position determination unit 220. For example, if the action-value function Q(S, A) is learned by Q-Learning, the update amount calculation unit 610 calculates the update amount Δ using equation 2 below.

$$\Delta = \alpha \left( R + \gamma \max_{A'} Q(S', A') - Q(S, A^*) \right) \quad \text{equation 2}$$

In equation 2,
A* is the position where the target item is actually placed,
S' is observation information for a next target item,
A' is a target position of the next target item,
γ is a constant referred to as a discount factor (0<γ≤1), and
α is a constant.

If the robot 100 ends a force-controlled motion in a start point 430 side before a target position 420 when moving the target item 171 by the force-controlled motion, the update amount calculation unit 610 calculates, on the hypothesis that the item collides with the box 160 or other items at the target position 420 ($A_0$), an update amount $\Delta'$ using equation 3 below.

$$\Delta' = \alpha\left(R' + \gamma' \max_{A'} Q(S', A') - Q(S, A_0)\right) \quad \text{equation 3}$$

In equation 3,
R' is a reward given in the case of a collision of the target item, and
$\gamma'$ is a constant ($0 \leq \gamma' \leq 1$).

Respective rewards R for positions, as well as the position A* where the target item 171 is actually placed or the target position $A_0$, may be determined, so that the action-value function Q(S, A) is updated. On the basis of a motion of the robot 100 made according to a motion plan, for example, zero or a positive reward R (or R') is set for each position located from the start point 430 of the force control to a point at which the force-controlled motion ends, and a negative reward R (or R') given in the case of a collision of an item is set for each position located from the point at which the force-controlled motion ends to an end point 440 of the force control. The update amount calculation unit 610 may calculate the update amount $\Delta$ or $\Delta'$ of the action-value function Q(S, A), using these positions and rewards.

The update amount calculation unit 610 may store a combination (S, A*, R, and S') necessary to calculate the update amount $\Delta$ or a combination (S, $A_0$, R', and S') necessary to calculate the update amount $\Delta'$ in a buffer, and retrieve one or more combinations of them from the buffer at random to calculate the update amount $\Delta$ or $\Delta'$. The calculated update amount $\Delta$ or $\Delta'$ is sent to the target position determination unit 220.

The target position determination unit 220 updates the action-value function Q(S, A), using the calculated update amount $\Delta$ or $\Delta'$. The target position determination unit 220 updates the action-value function Q(S, A) by performing backpropagation using $\Delta^2/2$ or $\Delta'^2/2$ as a loss function, when the action-value function Q(S, A) is learned with a neural network.

By updating the action-value function Q(S, A) in the above-described manner, a difference D(S) calculated by the functional difference evaluation unit 230 can be gradually made smaller. As a result, the length of the force-controlled motion, that is, the length between the start point and the end point of the force control, becomes shorter, and thus the motion time can be shortened.

Moreover, the target position determination unit 220 may select a target position at random with a fixed probability e from a specific position range, when determining the target position 420 ($A_0$). This specific position range is, for example when observation information S is obtained, a range including a position where an action-value function Q(S, A) corresponding to the observation information S is the greatest, for example, a range of $\pm T$ of each coordinate axis with the position where the action-value function Q(S, A) is the greatest as the center. T may be a predetermined value, or may be a value that becomes greater as a difference D(S) calculated by the functional difference evaluation unit 230 is greater and that becomes smaller as the difference D(S) is smaller. Since the target position 420 is selected at random, the action-value function Q(S, A) and the difference D(S) can be effectively optimized.

Figure 9:
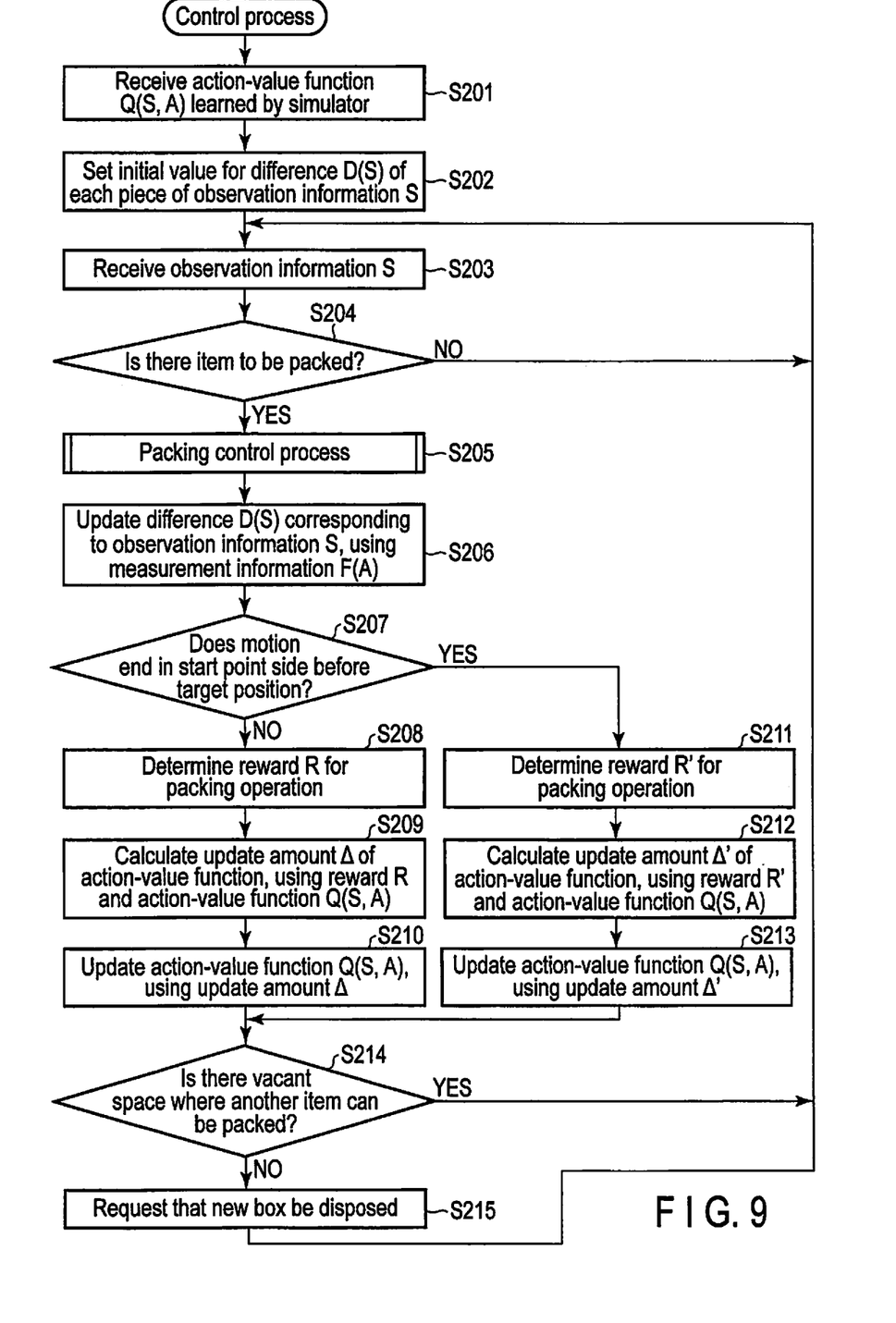
FIG. 9 is a flowchart showing an example of the procedure of a control process executed by the robot motion planning device of the second embodiment.

The flowchart of FIG. 9 shows an example of the procedure of a control process executed by the robot motion planning device 120. The procedure in steps S201 to S206 is the same as the procedure in steps S11 to S16 described above with reference to the flowchart of FIG. 5.

After a packing motion of the robot 100 is complete and a difference D(S) is updated using measurement information F(A) during a force-controlled motion of the packing motion, the robot motion planning device 120 determines whether or not the force-controlled motion ends in the start point 430 side before the target position 420 ($A_0$) (step S207).

If the force-controlled motion ends between the target position 420 and the end point 440 (NO in step S207), the robot motion planning device 120 determines a reward R for the packing motion (more specifically, the force-controlled motion of the packing motion) (step S208). The robot motion planning device 120 determines an update amount $\Delta$ of an action-value function Q(S, A), using the determined reward R and the action-value function Q(S, A) (step S209). Equation 2, described above, is used to calculate the update amount $\Delta$. The robot motion planning device 120 updates the action-value function Q(S, A), using the update amount $\Delta$ (step S210), and the flow proceeds to step S214.

In contrast, if the force-controlled motion ends in the start point 420 side before the target position 420 (e.g., if the force-controlled motion ends between the start point 420 and the target position 420) (YES in step S207), the robot motion planning device 120 determines a reward R' for the packing motion (step S211). The robot motion planning device 120 determines an update amount $\Delta'$ of an action-value function Q(S, A), using the determined reward R' and the action-value function Q(S, A) (step S212). Equation 3, described above, is used to calculate the update amount $\Delta'$. The robot motion planning device 120 updates the action-value f unction Q(S, A), using the update amount $\Delta'$ (step S213), and the flow proceeds to step S214.

The procedure in steps S214 to S215 is the same as the procedure in steps S17 and S18 described above with reference to the flowchart of FIG. 5.

Through the above-described process, not only a difference D(S) is updated in accordance with measurement information F(A) obtained by an actual packing motion, but also an action-value function Q(S, A) is updated in accordance with a reward R given according to a result of the packing motion. Thus, these parameters can be optimized in accordance with the actual configuration and environment of the robot 100.

As described above, according to the first and second embodiments, a force-controlled motion time of a robot can be shortened. An observation information reception unit 210 receives observation information S obtained by observing at least part of a movable range of the robot 100. If first observation information $S_1$ is received by the observation information reception unit 210, the target position determination unit 220 determines a first target position $A_0$ to which the robot 100 is to make a motion, using an action-value function Q(S, A) and the first observation information $S_1$. The action-value function Q(S, A) is a function of observation information S and a position A, and indicates the value of a motion to be made by the robot 100. The measurement information reception unit 260 receives measurement information F(A) obtained by measuring the state of the robot 100. The functional difference evaluation unit 230 calculates a first difference $D(S_1)$ corresponding to the first observation information $S_1$, using the measurement information F(A). The force control planning unit 240 determines a motion plan of a force-controlled motion of the robot 100 based on the first target position $A_0$ and the first difference $D(S_1)$.

By virtue of the above-described configuration, it is possible to shorten the force-controlled motion time of the robot 100 while causing the robot 100 to make a motion safely according to a motion plan determined using, for example, not only an action-value function Q(S, A) generated by learning with the simulator 180 but also a difference D(S).

Each of the various functions disclosed in the first and second embodiments may be realized by a circuit (processing circuit). Examples of the processing circuit include a programmed processor such as a central processing unit (CPU). The processor executes each of the disclosed functions by executing a computer program (instructions) stored in a memory. The processor may be a microprocessor including an electronic circuit. Examples of the processing circuit include a digital signal processor (DSP), an application-specific integrated circuit (ASIC), a microcontroller, a controller, and other electronic circuit components. Each of the components other than the CPU disclosed in the embodiments also may be realized by the processing circuit.

Since various processes of the first and second embodiments may be realized by a computer program, the same advantages as those of the embodiments can easily be obtained simply by installing the computer program in a computer through a computer-readable storage medium in which the computer program is stored and by executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A robot motion planning device comprising:
a memory; and
processing circuitry configured to:
receive observation information obtained by observing at least part of a movable range of a robot;
determine, in a case where first observation information is received, a first target position to which the robot is to make a motion, using an action-value function and the first observation information, the action-value function being a function of observation information and a position and being indicative of a value of a motion to be made by the robot;
receive measurement information obtained by measuring a state of the robot;
calculate a first difference corresponding to the first observation information, using the measurement information; and
determine a motion plan of a force-controlled motion of the robot, based on the first target position and the first difference,
wherein the processing circuitry is configured to make a distance between a start point and an end point of the force-controlled motion longer as the first difference is greater.

2. The robot motion planning device of claim 1, wherein the processing circuitry is further configured to:
determine a first reward, based on a motion made by the robot according to the motion plan; and
update the action-value function, using the first reward.

3. The robot motion planning device of claim 2, wherein the processing circuitry is configured to:
calculate an update amount of the action-value function, using at least the first reward and the action-value function; and
update the action-value function, using the update amount.

4. The robot motion planning device of claim 2, wherein the processing circuitry is further configured to:
determine second rewards corresponding to positions, respectively, based on the motion made by the robot according to the motion plan; and
update the action-value function, using the second rewards.

5. The robot motion planning device of claim 2, wherein the processing circuitry is further configured to determine the first target position at random from a range that is determined based on the action-value function and the first difference.

6. The robot motion planning device of claim 1, wherein the processing circuitry is configured to:
receive first measurement information obtained by measuring a state of the robot that makes a motion according to the motion plan; and
update the first difference, using the first measurement information.

7. The robot motion planning device of claim 6, wherein the processing circuitry is configured to update the first difference, using a difference between a first change point of a first action-value function of the action-value function and a second change point of the first measurement information, the first action-value function corresponding to the first observation information.

8. The robot motion planning device of claim 7, wherein the first measurement information comprises pieces of information, and each of the pieces of information indicates a position of a movable portion of the robot and force applied to the movable portion at the position, and
the processing circuitry is configured to update the first difference, using a difference between a first position where the first action-value function declines by a first threshold value or more and a second position where the first measurement information exceeds a second threshold value.

9. The robot motion planning device of claim 1, wherein the processing circuitry is further configured to display information on the first difference on a screen of a display.

10. The robot motion planning device of claim 9, wherein the information on the first difference indicates whether the robot is abnormal based on a fluctuation in the first difference in chronological order.

11. The robot motion planning device of claim 1, wherein the processing circuitry is further configured to display information on one or more differences on a screen of a display device, the one or more differences corresponding to one or more pieces of observation information that are received, respectively.

12. The robot motion planning device of claim 11, wherein
the processing circuitry is further configured to display a statistic of the one or more differences of each type of object on the screen as the information on the one or more differences.

13. The robot motion planning device of claim 1, wherein the processing circuitry is configured to:
acquire a first action-value function corresponding to the first observation information from the action-value function; and
determine the first target position, using the first action-value function.

14. The robot motion planning device of claim 13, wherein
the processing circuitry is configured to determine a position where the first action-value function is greatest as the first target position.

15. The robot motion planning device of claim 1, further comprising:
a transmitter configured to transmit a control signal based on the motion plan to the robot.

16. The robot motion planning device of claim 15, wherein
the processing circuitry is further configured to:
receive first measurement information obtained by measuring a state of the robot while the robot is making a motion based on the control signal; and
update the first difference, using the first measurement information.

17. A robotic system comprising:
a robot; and
a robot motion planning device comprising:
a memory; and
processing circuitry configured to:
receive observation information obtained by observing at least part of a movable range of a robot;
determine, in a case where first observation information is received, a first target position to which the robot is to make a motion, using an action-value function and the first observation information, the action-value function being a function of observation information and a position and being indicative of a value of a motion to be made by the robot;
receive measurement information obtained by measuring a state of the robot;
calculate a first difference corresponding to the first observation information, using the measurement information; and
determine a motion plan of a force-controlled motion of the robot, based on the first target position and the first difference,
wherein the processing circuitry is configured to make a distance between a start point and an end point of the force-controlled motion longer as the first difference is greater.

18. A method comprising:
receiving observation information obtained by observing at least part of a movable range of a robot;
in a case where first observation information is received, determining a first target position to which the robot is to make a motion, using an action-value function and the first observation information, the action-value function being a function of observation information and a position and being indicative of a value of a motion to be made by the robot;
receiving measurement information obtained by measuring a state of the robot;
calculating a first difference corresponding to the first observation information, using the measurement information; and
determining a motion plan of a force-controlled motion of the robot, based on the first target position and the first difference,
wherein the determining the motion plan comprises making a distance between a start point and an end point of the force-controlled motion longer as the first difference is greater.

* * * * *